United States Patent
Ter-Grigoryan et al.

(10) Patent No.: US 9,996,474 B2
(45) Date of Patent: Jun. 12, 2018

(54) MULTIPLE STAGE MEMORY MANAGEMENT

(71) Applicant: ARM Limited, Cambridge (GB)

(72) Inventors: Vahan Ter-Grigoryan, Cambridge (GB); Hakan Lars-Goran Persson, Bjarred (SE); Jesus Javier de los Reyes Darias, Littleport (GB); Vinod Pisharath Hari Pai, Cambridge (GB)

(73) Assignee: Arm Limited, Cambridge (GB)

( * ) Notice: Subject to any disclaimer, the term of this patent is extended or adjusted under 35 U.S.C. 154(b) by 44 days.

(21) Appl. No.: 15/076,764

(22) Filed: Mar. 22, 2016

(65) Prior Publication Data

US 2016/0283396 A1 Sep. 29, 2016

(30) Foreign Application Priority Data

Mar. 24, 2015 (GB) .................................. 1504971.1

(51) Int. Cl.
*G06F 12/10* (2016.01)
*G06F 12/1009* (2016.01)
*G06F 12/1045* (2016.01)

(52) U.S. Cl.
CPC ...... *G06F 12/1009* (2013.01); *G06F 12/1045* (2013.01); *G06F 2212/1024* (2013.01);
(Continued)

(58) Field of Classification Search
CPC ............. G06F 12/1009; G06F 12/1045; G06F 2212/1024; G06F 2212/507; G06F 2212/651; G06F 2212/681
(Continued)

(56) References Cited

U.S. PATENT DOCUMENTS 5,479,629 A 12/1995 Angjelo et al.
5,784,707 A 7/1998 Khalidi et al.
(Continued)

FOREIGN PATENT DOCUMENTS

EP 2 849 071 A1 3/2015
EP 2 874 066 A1 5/2015

*Primary Examiner* — Jasmine Song
(74) *Attorney, Agent, or Firm* — Leveque IP Law, P.C.

(57) ABSTRACT

A multiple stage memory management unit (MMU) comprises a first MMU stage configured to translate an input virtual memory address to a corresponding intermediate memory address, the first MMU stage generating a set of two or more intermediate memory addresses including the corresponding intermediate memory address; and a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage; the first MMU stage being configured to provide to the second MMU stage for translation, intermediate memory addresses in the set other than any intermediate memory addresses in the set for which the second MMU stage will provide a physical memory address as a response to translation of one of the other intermediate memory addresses in the set.

16 Claims, 10 Drawing Sheets

(52) U.S. Cl.
CPC ............... *G06F 2212/1028* (2013.01); *G06F 2212/507* (2013.01); *G06F 2212/651* (2013.01); *G06F 2212/681* (2013.01); *Y02B 60/1225* (2013.01)

(58) Field of Classification Search
USPC .......................................... 711/206
See application file for complete search history.

(56) References Cited

U.S. PATENT DOCUMENTS

| | | | |
|---|---|---|---|
| 2015/0178220 A1* | 6/2015 | Grubisic | G06F 12/1027 711/202 |
| 2015/0199280 A1* | 7/2015 | Molnar | G06F 12/1027 711/207 |

* cited by examiner

MULTIPLE STAGE MEMORY MANAGEMENT

BACKGROUND

This disclosure relates to memory management.

Memory management units (MMUs) attend to the translation of virtual memory addresses into physical memory addresses.

A data processing apparatus typically provides each running program with access to a virtual address space defined by virtual memory addresses. Each program sees its own virtual address space which contains instructions and data for use by that program. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache.

A cache known as a translation lookaside buffer (TLB) may be used as part of the address translation process. The TLB stores recently or commonly used translations between virtual and physical memory addresses. So, as a first step in an address translation process, the TLB is consulted to detect whether the TLB already contains the required address translation. If not, then a more involved translation process may be used, for example involving consulting so-called page tables holding address translation information, typically resulting in the TLB being populated with the required translation.

Multiple stage MMUs are used in some situations. In this arrangement, two levels of translation are in fact used. A virtual address (VA) required by an executing program or other system module such as a graphics processing unit (GPU) is translated to an intermediate physical address (IPA) by a first MMU stage. The IPA is translated to a physical address (PA) by a second MMU stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

SUMMARY

In an example arrangement there is provided a multiple stage memory management unit (MMU) comprising:

a first MMU stage configured to translate an input virtual memory address to a corresponding intermediate memory address, the first MMU stage generating a set of two or more intermediate memory addresses including the corresponding intermediate memory address; and a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage;

the first MMU stage being configured to provide to the second MMU stage for translation, intermediate memory addresses in the set other than any intermediate memory addresses in the set for which the second MMU stage will provide a physical memory address as a response to translation of one of the other intermediate memory addresses in the set.

In another example arrangement there is provided a multiple stage memory management unit (MMU) comprising:

a first MMU stage configured to translate an input virtual memory address to an intermediate memory address;

a second MMU stage configured to translate an intermediate memory address provided by the first MMU stage to a physical memory address; and an address translation cache associated with the first MMU stage, the address translation cache being configured to store, for a set of virtual memory addresses, address translation information comprising:

information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address.

In another example arrangement there is provided a multiple stage memory management unit (MMU) comprising:

a first MMU translation means for translating an input virtual memory address to a corresponding intermediate memory address, the first MMU translation means generating a set of two or more intermediate memory addresses including the corresponding intermediate memory address; and a second MMU translation means for translating an intermediate memory address provided by the first MMU stage to a physical memory address, the second MMU translation means providing, in response to an intermediate memory address received from the first MMU translation means, a set of two or more physical memory addresses including the physical memory address corresponding to the intermediate memory address received from the first MMU translation means; in which the first MMU translation means is configured to provide to the second MMU translation means for translation, intermediate memory addresses in the set other than any intermediate memory addresses in the set for which the second MMU translation means will provide a physical memory address as a response to translation of one of the other intermediate memory addresses in the set.

In another example arrangement there is provided a multiple stage memory management unit (MMU) comprising:

a first MMU translation means for translating an input virtual memory address to an intermediate memory address;

a second MMU translation means for translating an intermediate memory address provided by the first MMU translation means to a physical memory address; and means associated with the first MMU translation means for caching, for a set of virtual memory addresses, address translation information comprising:

information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address.

In another example arrangement there is provided a method of operation of a multiple stage memory management unit (MMU, the method comprising:

translating, at a first MMU stage, an input virtual memory address to a corresponding intermediate memory address, the translating step generating a set of two or more intermediate memory addresses including the corresponding intermediate memory address;

translating, at a second MMU stage, an intermediate memory address provided by the first MMU stage to a physical memory address, comprising providing, in response to an intermediate memory address received from the first MMU stage, a set of two or more physical memory addresses including the physical memory address corresponding to the intermediate memory address received from the first MMU stage; and the first MMU stage providing to the second MMU stage for translation, intermediate memory addresses in the set other than any intermediate memory addresses in the set for which the second MMU stage will provide a physical memory address as a response to translation of one of the other intermediate memory addresses in the set.

In another example arrangement there is provided a method of operation of a multiple stage memory management unit (MMU), the method comprising:

translating, at a first MMU stage, an input virtual memory address to an intermediate memory address;

translating, at a second MMU stage, an intermediate memory address provided by the first MMU stage to a physical memory address; and caching, in association with the first MMU stage and for a set of virtual memory addresses, address translation information comprising:

information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
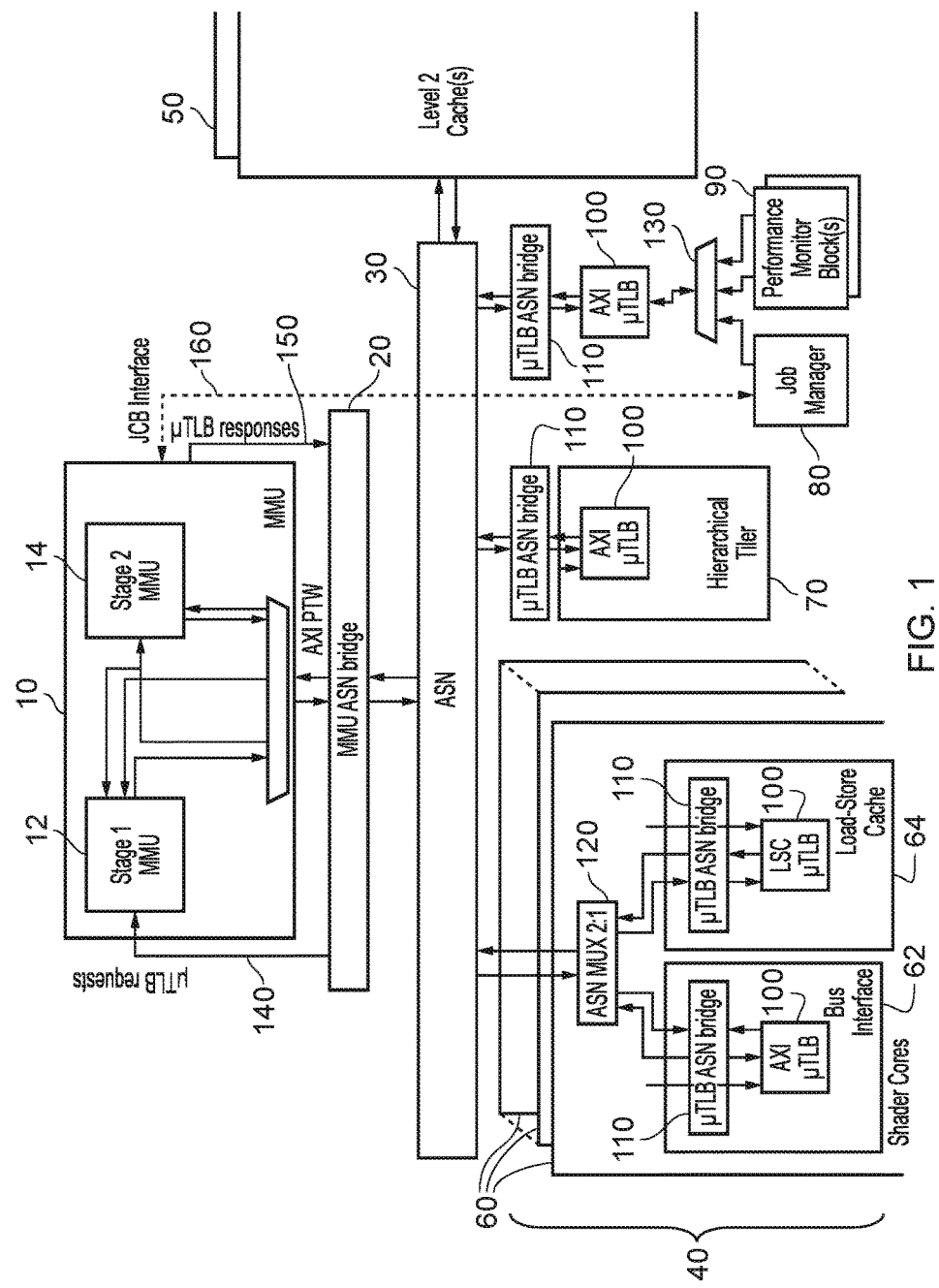
FIG. 1 is a schematic diagram of a memory management arrangement.

Before discussing the embodiments with reference to the accompanying figures, the following description of embodiments is provided.

An example embodiment provides a multiple stage memory management unit (MMU) comprising:

a first MMU stage configured to translate an input virtual memory address to a corresponding intermediate memory address, the first MMU stage generating a set of two or more intermediate memory addresses including the corresponding intermediate memory address; and a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage;

the first MMU stage being configured to provide to the second MMU stage for translation, intermediate memory addresses in the set other than any intermediate memory addresses in the set for which the second MMU stage will provide a physical memory address as a response to translation of one of the other intermediate memory addresses in the set.

In this example arrangement, techniques are provided for detecting (and avoiding having to make) certain types of stage 2 translation in an MMU, by elegantly re-using data returned in response to other stage 2 MMU translations. This arrangement can in some examples provide an improved throughput of data at the MMU, and can provide a reduction in the processing time taken to provide a response from the MMU and/or a reduction in the power consumption of the MMU to provide such a response.

In example embodiments, the memory management unit comprises a buffer configured to store at least those of the set of two or more physical memory addresses received from the second MMU stage which correspond to intermediate memory addresses in the set of two or more intermediate memory addresses.

In example embodiments, the first MMU stage is configured to translate an input virtual memory address with reference to a page table; and the set of two or more (for example, 8) intermediate memory addresses comprises: the intermediate memory address corresponding to the input virtual memory address; and one or more other intermediate memory addresses representing entries adjacent, in the page table, to the entry holding the corresponding intermediate memory address (for example, being those entries in the same cache line). In example embodiments the set of two or more (for example, 4) physical memory addresses comprises: the physical memory address corresponding to the intermediate memory address provided to the second MMU stage; and one or more other physical memory addresses corresponding to intermediate memory addresses adjacent, in the intermediate memory address space, to the intermediate memory address provided to the second MMU stage.

As an example of a test to detect whether an intermediate memory address requires stage 2 translation, control logic can be configured to control transmission of intermediate memory addresses by the first MMU stage to the second MMU stage for translation, and the control logic can be configured to detect whether two or more intermediate memory addresses in the set of two or more intermediate memory addresses are within a threshold separation of one another in the intermediate memory address space.

In example embodiments, only a subset of intermediate memory addresses is passed for stage 2 translation as a result of the procedures set out here, so that the control logic is configured to control the providing of one or more of the intermediate memory addresses in the set of two or more intermediate memory addresses to the second MMU stage so as to obtain physical memory addresses corresponding to each of the intermediate memory addresses in the set of two or more intermediate memory addresses.

To avoid generating error responses in respect of intermediate memory addresses which do not actually correspond to the virtual address for which translation was requested, in example embodiments for any one of the intermediate memory addresses in the set of two or more intermediate memory addresses apart from or other than the intermediate memory address corresponding to the input virtual memory address, the control logic is configured to control the transmission of that intermediate memory address to the second MMU stage for translation in a speculative translation mode so that an error message is not generated if the translation of that intermediate memory address fails.

In some examples, the one or more intermediate memory addresses provided to the second MMU stage includes at least the intermediate memory address corresponding to the input virtual memory address. However, in other examples, the one or more intermediate memory addresses supplied to the second MMU stage could omit the intermediate memory address corresponding to the input virtual memory address if a translation of that input virtual memory address is provided by a set of physical addresses returned in response to another intermediate memory address.

Although other types of translation could be used, in example embodiments the first MMU stage is configured to access a hierarchy of page tables, such that a page table higher in the hierarchy provides information for address translation by the second stage MMU to point to a page table next lower in the hierarchy. For example, a lowest page table in the hierarchy can provide the set of two or more intermediate memory addresses including the corresponding intermediate memory address.

To provide further potential savings of processing cycles and/or power, in example embodiments the memory management unit comprises an address translation cache associated with the first MMU stage, the address translation cache being configured to store, for a set of virtual memory addresses, address translation information comprising: information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address. In this way, VA to PA translations can be cached at the MMU for a more rapid supply to the requesting TLB.

An example embodiment using such a technique provides a multiple stage memory management unit (MMU) comprising:

a first MMU stage configured to translate an input virtual memory address to an intermediate memory address;

a second MMU stage configured to translate an intermediate memory address provided by the first MMU stage to a physical memory address; and an address translation cache associated with the first MMU stage, the address translation cache being configured to store, for a set of virtual memory addresses, address translation information comprising:
  information defining address translations from those virtual memory addresses to respective mapped addresses, the mapped addresses being intermediate memory addresses or physical memory addresses; and
  flag information indicating, for each virtual memory address in the set of virtual memory addresses, whether the mapped address corresponding to that virtual memory address is an intermediate memory address or a physical memory address.

Another example embodiment provides a method of operation of a multiple stage memory management unit (MMU, the method comprising:

translating, at a first MMU stage, an input virtual memory address to a corresponding intermediate memory address, the translating step generating a set of two or more intermediate memory addresses including the corresponding intermediate memory address;

translating, at a second MMU stage, an intermediate memory address provided by the first MMU stage to a physical memory address, comprising providing, in response to an intermediate memory address received from the first MMU stage, a set of two or more physical memory addresses including the physical memory address corresponding to the intermediate memory address received from the first MMU stage; and the first MMU stage providing to the second MMU stage for translation, intermediate memory addresses in the set other than any intermediate memory addresses in the set for which the second MMU stage will provide a physical memory address as a response to translation of one of the other intermediate memory addresses in the set.

Another example embodiment provides a method of operation of a multiple stage memory management unit (MMU), the method comprising:

translating, at a first MMU stage, an input virtual memory address to an intermediate memory address;

translating, at a second MMU stage, an intermediate memory address provided by the first MMU stage to a physical memory address; and caching, in association with the first MMU stage and for a set of virtual memory addresses, address translation information comprising:
  information defining address translations from those virtual memory addresses to respective mapped addresses, the mapped addresses being intermediate memory addresses or physical memory addresses; and
  flag information indicating, for each virtual memory address in the set of virtual memory addresses, whether the mapped address corresponding to that virtual memory address is an intermediate memory address or a physical memory address.

Referring now to the accompanying drawings, FIG. 1 is a schematic diagram of a memory management arrangement, in the context of the operation of a graphics processing unit (GPU), although the present techniques relating to memory management and address translation are more generally applicable to general-purpose data processing. A memory management unit (MMU) 10 is connected via an MMU ASN bridge 20 to an asynchronous switch network (ASN) 30. Elements of a GPU 40 and a level 2 cache memory 50 are also connected to the ASN. The ASN therefore acts to pass information to and from each of the units or modules connected to the ASN.

In connection with the techniques being described here, in the context of a GPU, throughput of data is very important, perhaps (in at least some instances) more so than latency. The present techniques can provide an improved throughput in at least some instances.

Example modules of the GPU 40 are illustrated, including one or more shader cores 60 each including a bus interface module 62 and a load-store cache module 64, a hierarchical tiler 70, a job manager 80 and performance monitor blocks 90. In general terms, these modules operate in accordance with established principles of GPU operation and further specific details of their internal operation will not be given except where they are relevant to the present discussion.

Each of the modules of the GPU is associated with a respective micro translation lookaside buffer (μTLB) 100. During the operation of the modules, there is a routine need to access system memory. Memory addresses are expressed for the purposes of internal processing within the modules of the GPU as virtual addresses (VAs). In order to proceed with an actual access to system memory, a VA needs to be translated to a physical address (PA) by which the system memory is addressed at an electrical level. This translation is carried out by each of the μTLBs, so that an address translation relating to a particular module is carried out by the μTLB associated with that module. In this way, address translation is, to an extent, distributed throughout the system. The operation of an μTLB will be discussed further with reference to FIGS. 2 and 3.

The μTLBs are connected to the ASN 30 by a respective μTLB ASN bridge 110. In some cases this is via a further multiplexing stage 120, while in another case two of the modules may be connected via a multiplexer 130 to a single μTLB 100.

The level 2 cache 50 provides a local, and generally somewhat faster, storage area for selected contents of a main system memory (not shown in FIG. 1). Recently or frequently accessed portions of the main system memory, or portions of the main system memory which are expected to be required in the near future such as portions adjacent to recently accessed portions, are replicated in the level 2 cache 50 so that those portions can be accessed quickly when needed. If a required portion is not currently held in the level 2 cache 50, then that portion is fetched from the main system memory when access to that portion is required. In these respects, the level 2 cache 50 operates according to established principles associated with such cache memories and so details of its operation will not be described except where they are relevant to the present discussion. It is noted that the contents of the level 2 cache memory 50 are accessed according to their physical address.

The MMU 10 is a two-stage MMU (as an example of a multiple stage MMU), comprising a stage 1 MMU 12 and a stage 2 MMU 14. A virtual address (VA) required by an executing program or other system module such as the GPU 40 is translated to an intermediate physical address (IPA) by the stage 1 MMU. The IPA is translated to a physical address (PA) by the stage 2 MMU. As mentioned earlier, one reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

A main reason why the MMU 10 is required is that it handles address translations which are not currently stored locally in the respective μTLB. The way in which this is carried out will be discussed further with reference to FIG. 2 below. In handling these matters, the MMU 10 receives requests 140 from the μTLBs via the ASN and returns responses 150 to the μTLBs, again via the ASN. Optionally, the MMU 10 can also interact with the job manager 80 via a JCB (job control bus) interface 160.

The internal operation of the MMU 10 will be discussed in more detail with reference to FIGS. 7-10 below.

Figure 2:
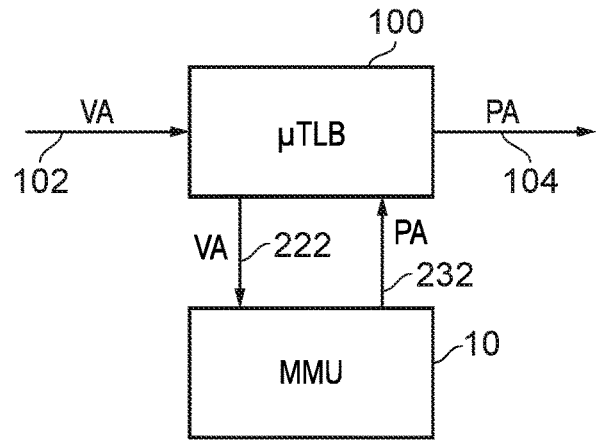
FIG. 2 schematically illustrates the use of a micro translation lookaside buffer (μTLB)

FIG. 2 schematically illustrates the use of a micro translation lookaside buffer (μTLB) 100. For the purposes of FIG. 2, other items relating to the data communication between the μTLB and the MMU 10 are omitted for clarity of the diagram.

Figure 3:
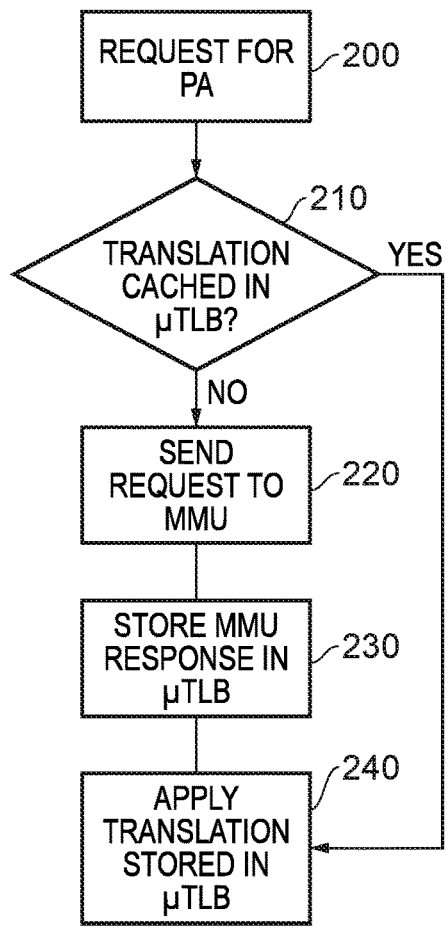
FIG. 3 is a schematic flowchart illustrating operations of a μTLB.

As part of the operation of the module or other arrangement with which the μTLB 100 is associated, the μTLB 100 receives a VA 102 relating to a required memory access. This could of course be a read or a write memory access; it is immaterial to the present discussion which type of memory access is underway. Referring also to FIG. 3 (which is a schematic flowchart illustrating operations of a μTLB), supply of a VA 102 to the μTLB 100 forms a request for a corresponding PA 104 (shown in FIG. 3 as a step 200).

The μTLB contains a cache or store of translations between VA and PA. The criteria by which the μTLB stores particular VA to PA translations can be established according to known techniques for the operation of a μTLB. The cached translations might include recently used translations, frequently used translations and/or translations which are expected to be required soon (such as translations relating to VAs which are close to recently-accessed VAs). Overall, the situation is that the μTLB contains a cache of a subset of the set of all possible VA to PA translations, such that when a particular VA to PA translation is required, it may be found that the translation is already held in the cache at the μTLB, or it may not.

Accordingly, at a next step 210, the μTLB detects whether the required translation is indeed currently cached by the μTLB. If the answer is yes, then control passes to a step 240 to be discussed below. If the answer is no, then control passes to a step 220 at which the μTLB 100 sends a request, comprising the required VA 222, to the MMU 10. The MMU 10 derives the required VA to PA translation (using techniques to be discussed below) and sends at least the PA 232 corresponding to the VA 222 back to the μTLB 100 where it is stored at a step 230.

Finally, at the step 240, the μTLB 100 applies the translation stored at the μTLB 100 to provide an output PA 104.

It can therefore be seen that in the distributed system described with reference to FIG. 1, in which multiple μTLBs are used, the translation of a VA to a PA takes effect at the appropriate μTLB 100. The MMU 10 provides translation information for storage at the μTLB 100, but even with the involvement of the MMU 10 in obtaining a required translation, the actual translation still takes place at the μTLB 100. Similar principles may also apply in a non-distributed system having only one TLB.

Aspects of the operation of the MMU 10 will now be described with reference to FIG. 4, which provides an example of a multiple stage memory management unit (MMU) in which an input virtual memory address is translated to a physical memory address via a corresponding intermediate memory address, the memory management unit comprising: a first MMU stage, for example configured to translate the input virtual memory address to the corresponding intermediate memory address by reference to a page table, the page table providing a set of two or more intermediate memory addresses including the corresponding intermediate memory address; and a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage. These arrangements therefore provide examples of a first MMU stage configured to translate an input virtual memory address to a corresponding intermediate memory address, the first MMU stage generating a set of two or more intermediate memory addresses including the corresponding intermediate memory address; and a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage.

Figure 4:
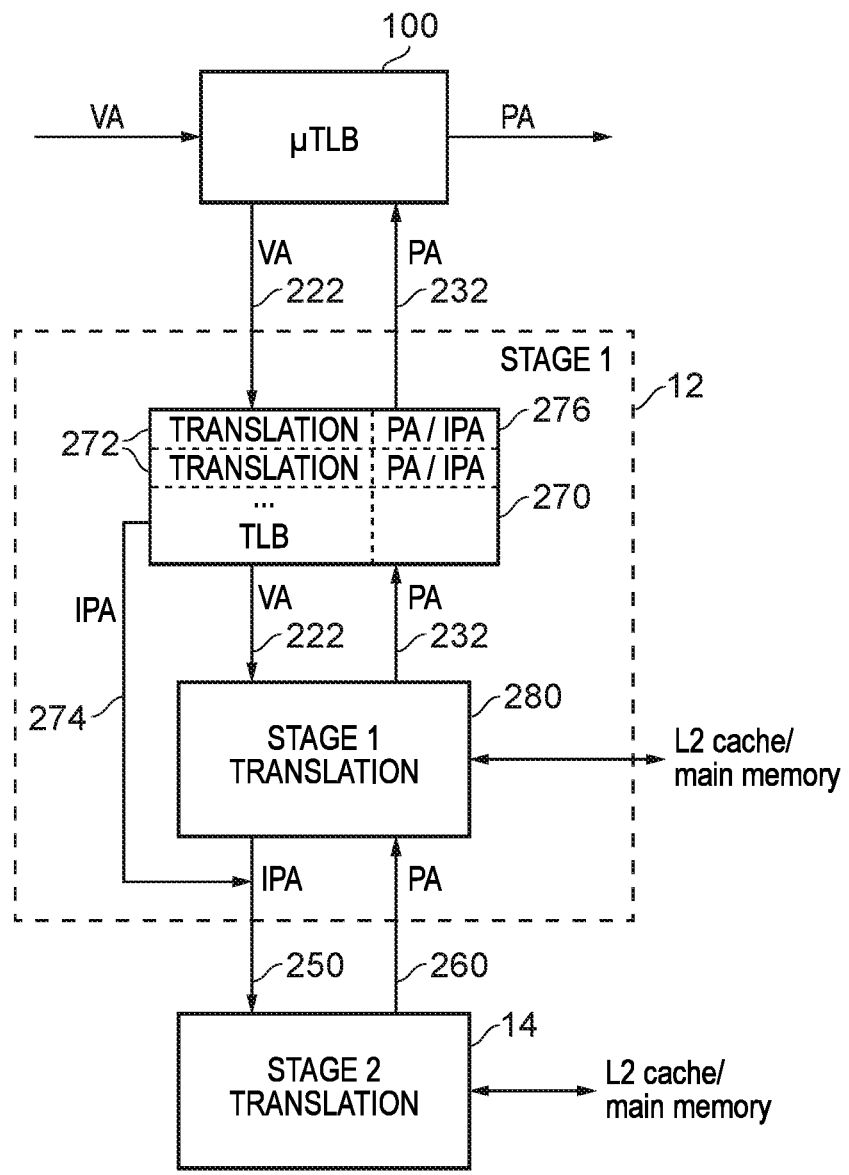
FIG. 4 schematically illustrates a memory management unit (MMU)

The arrangement of FIG. 4, when operated as discussed here, provides an example of features of a method of operation of a memory management unit.

In FIG. 4, the µTLB 100 is shown in the same manner as in FIG. 2 described above. However, the operation of the MMU 10 is split into stage 1 and stage 2 operations.

The stage 1 MMU 12 is responsible for translating the VA 222 into an intermediate physical address (IPA) 250. The stage 2 MMU 14 is responsible for translating the IPA 250 into a PA 260. As part of the translation process, the stage 1 MMU 12 and the stage 2 MMU 14 may need to access so-called page tables which are stored in physical memory (for example, in the level 2 cache 50).

The stage 1 MMU comprises its own TLB 270. The TLB 270 provides a cache or buffer of address translations 272 relevant to the stage 1 MMU. Given that the task of the stage 1 MMU is to translate an incoming VA to an IPA, the TLB 270 can store VA to IPA translations so that if an incoming VA 222 has a translation to the corresponding IPA stored in the TLB 270, this avoids the need for a full operation of the stage 1 translation process and the buffered IPA 274 can be provided directly to the stage 2 MMU as the IPA 250.

However, the TLB 270 provides further information, and in particular the address translations 272 which are cached at the TLB 270 may in fact provide a cached VA to PA translation. To indicate the nature of the address translations 272 cached at the TLB 270, a flag 276 is provided in respect of each cached address translation 272 to indicate whether that cached address translation 272 relates to a VA to IPA translation or to a VA to PA translation. If, for an incoming VA 222, there exists a cached address translation 272 for which the flag 276 indicates that the cached address translation is a VA to PA translation, then the TLB 270 simply provides the cached PA as the PA 232 to be returned to the µTLB 100 and the MMU operation (in respect of that particular translation request) is complete.

Assume now that the TLB 270 did not contain a cached translation (whether VA to IPA or VA to PA) in respect of the incoming VA 222. In this case, the VA 222 is passed to a stage 1 translation unit 280. The stage 1 translation unit 280 consults so-called page tables, for example in a so-called page table walk (PTW) process to derive a VA to IPA translation. An example of a PTW process will be discussed below. The page tables are held in physical memory, for example the level 2 cache 50 or a main system memory, and are arranged as a hierarchy of page tables such that one page table in the hierarchy provides information which points to a location in a next page table in the hierarchy until a final page table is reached. But in respect of the stage 1 translation, the contents of the page tables are provided as IPAs rather than as PAs so that each time a page table is accessed as part of the stage 1 translation process, a stage 2 translation of the IPA returned as the page table contents is required before the physical address needed to access the next page table in the hierarchy can be obtained.

The stage 1 TLB 270 therefore provides an example of an address translation cache associated with the first MMU stage, the address translation cache being configured to store, for a set of virtual memory addresses, address translation information comprising: information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address.

Figure 5:
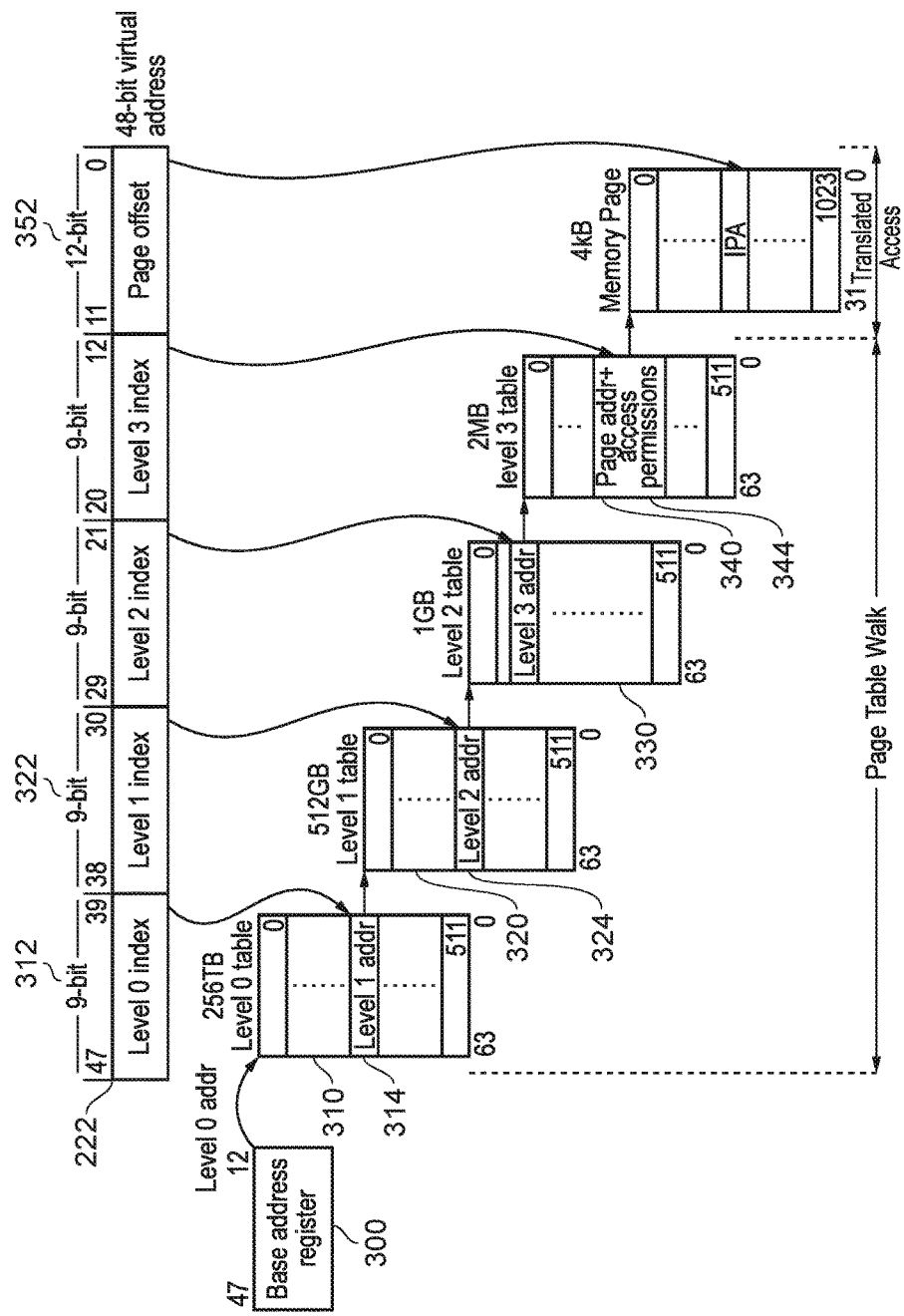
FIG. 5 schematically illustrates a page table walk (PTW) process.
Figure 6:
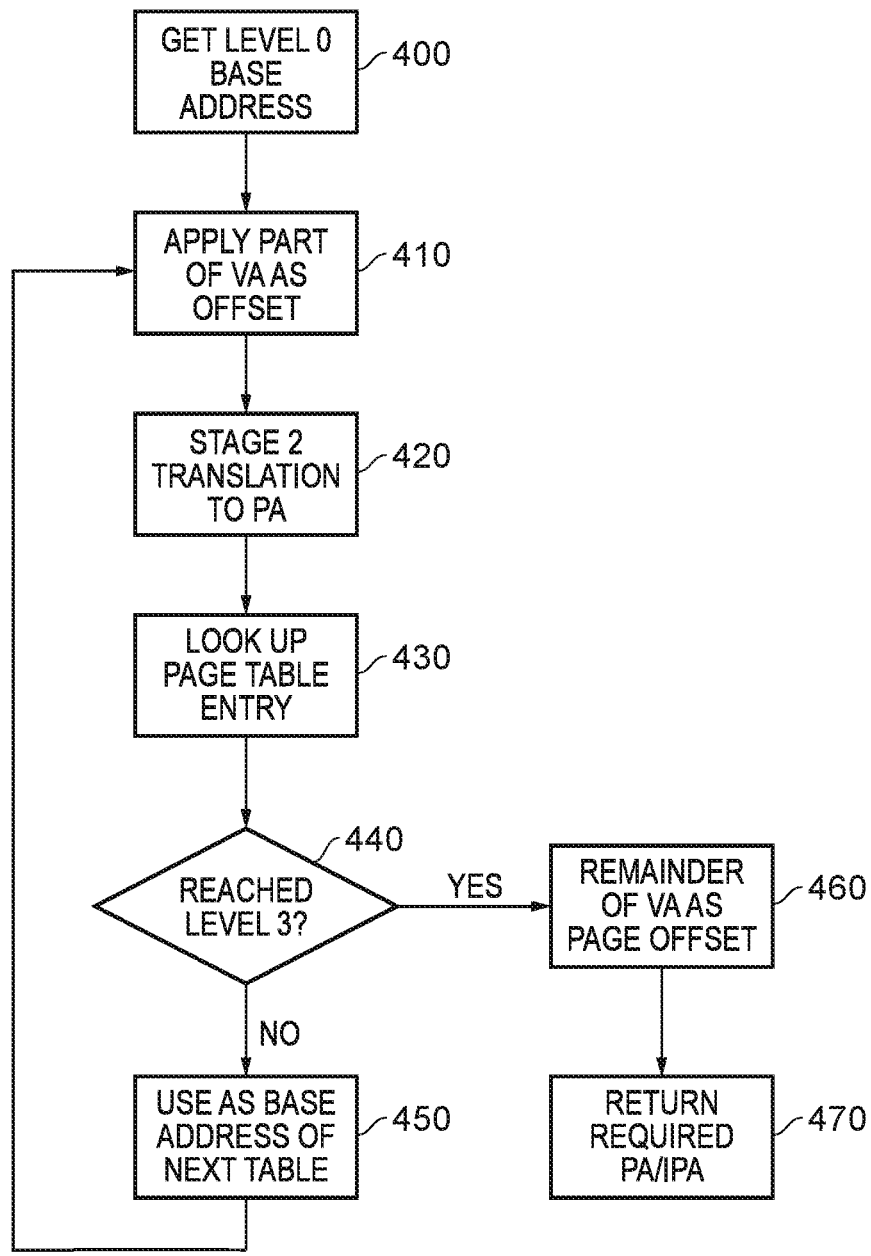
FIG. 6 is a schematic flowchart illustrating a PTW process.

FIG. 5 schematically illustrates an example of a stage 1 page table walk (PTW) process, and FIG. 6 is a schematic flowchart illustrating a PTW process.

In this example, a VA 222 which requires translation is formed as a 48-bit value. Different portions of the VA 222 are used at different stages in the PTW process.

To obtain a first entry in the page table hierarchy, in a "level 0 table" 310, a base address stored in a base address register 300 (FIG. 5) is obtained at a step 400 (FIG. 6). A first portion 312 of the VA 222, being the 9 most significant bits, is added to the base address as an offset, at a step 410 so as to provide the IPA 314 of an entry in the table 310. But in order to access the entry 314, a PA indicating the location of the entry 314 in physical memory is needed. Therefore, at a step 420, the IPA 314 of the page table entry is supplied to the stage 2 translation process for translation into a corresponding PA. When the corresponding PA is received, the relevant page table entry is looked up in physical memory or in the level 2 cache 50 (if the relevant page is cached) at a step 430.

At a step 440, a detection is made as to whether "level 3" has been reached in the page table hierarchy. If not, as in the present case, control passes to a step 450 at which the retrieved page table entry is used as a base address of a next table in the hierarchy. The page table entry corresponding to the IPA 314 therefore provides a base address to the next level table in the hierarchy, a "level 1 table" 320. Control returns to the step 410.

At the second iteration of the step 410, a further part 322 of the VA 222, being the next 9 bits [38:30] of the VA 222, forms an offset from the base address of the table 320 in order to provide the IPA of an entry 324 in the table 320. Once again, this IPA is subjected to stage 2 translation to provide a PA which can be looked up to obtain the base address of a "level 2 table" 330 which in turn (by the same process) provides the base address of a "level 3 table" 340.

When the steps 430 and 440 are carried out in respect of a page table entry defined by an IPA 344 in the table 340, the answer to the detection at the step 440 is "yes". The page table entry indicated by the IPA 344 provides a page address and access permissions relating to a physical memory page. The remaining portion 352 of the VA 222, namely the least significant 12 bits [11:0] provides a page offset within the memory page defined by the page table entry at the IPA 344, though in an example system which stores information as successive four byte (for example 32 bit) portions, it may be that the portion [11:2] provides the required offset to the address of the appropriate 32 bit word. Therefore, the combination (at a step 460) of the least significant portion of the VA 222 and the final page table entry (in this case, from the "level 3 table" 340) provides (at a step 470) the IPA 250 as a translation of the VA 222. Note that a PTW process as described here returns an IPA in respect of the PTW carried out by the stage 1 MMU, and returns a PA in respect of the PTW carried out by the stage 2 MMU.

In example embodiments, including some to be discussed below, the first MMU stage is configured to access a hierarchy of page tables, such that a page table higher in the hierarchy provides information for address translation by the second stage MMU to point to a page table next lower in the hierarchy, and a lowest page table in the hierarchy provides the set of two or more intermediate memory addresses including the corresponding intermediate memory address.

Figure 7:
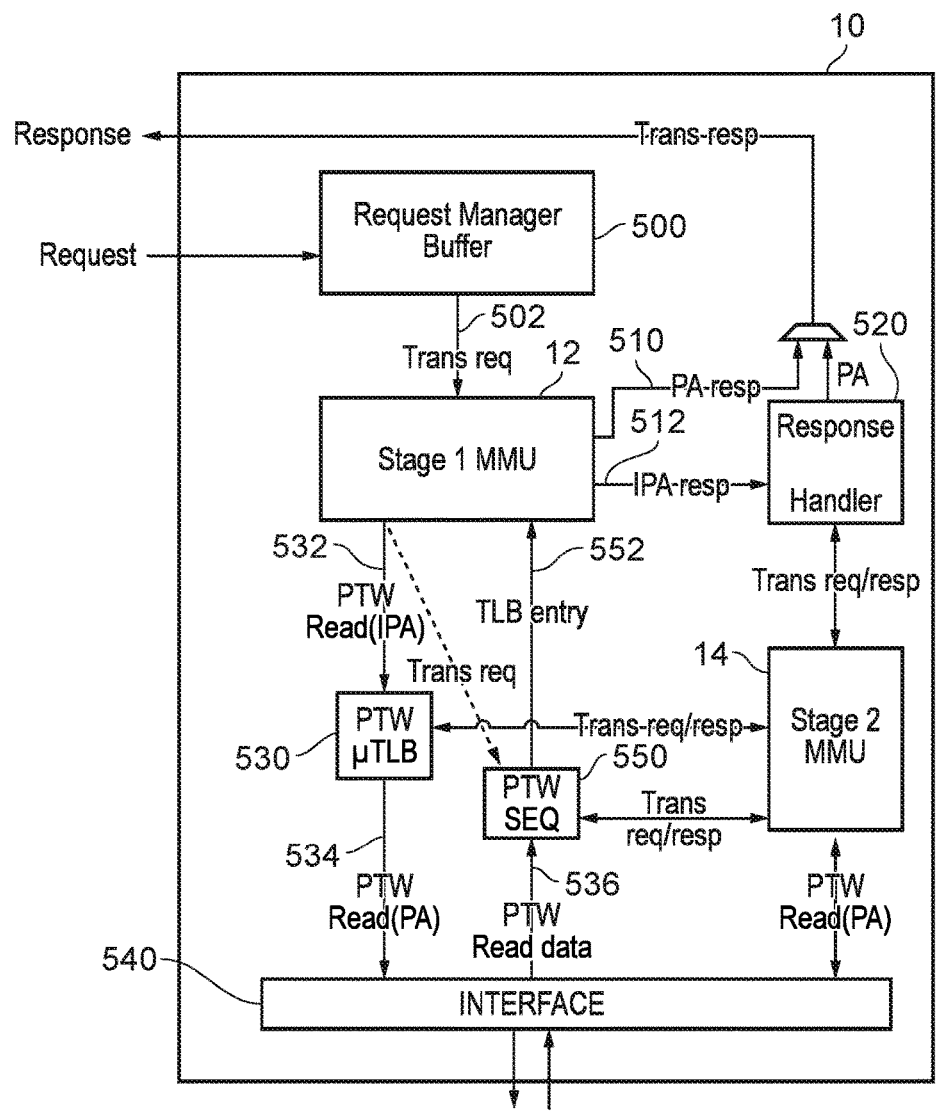
FIG. 7 schematically illustrates an MMU.

FIG. 7 schematically illustrates the MMU 10 in more detail.

A request manager buffer 500 receives requests from the µTLBs, buffers them and provides them to the stage 1 MMU 12 in an appropriate order for handling. Successive requests 502 are passed from the request manager buffer to the stage 1 MMU 12.

As discussed above, the stage 1 MMU may respond with a PA from its own cache, in which case the PA response 510 is supplied as a response output back to the µTLB which made the request. If however the stage 1 MMU responds with an IPA 512, this is passed to a response handler 520 which interacts with the stage 2 MMU to obtain a PA corresponding to that IPA, which in turn is then passed back to the requesting µTLB as a PA response.

As part of the operations of the stage 1 MMU and the stage 2 MMU, a PTW process is performed. In the case of the stage 1 MMU, as discussed above each PTW step involves a stage 2 translation of the IPA obtained by that a step, in order to retrieve the respective page table entry. At a PTW stage, an IPA 532 representing a read address for a page table entry requires translation to a corresponding PA. A PTW µTLB 530 provides a cache of IPA to PA translations relevant to PTW operations. If the required translation is held in the PTW µTLB 530, then the PTW µTLB outputs the corresponding PA 534. If not, then the PTW µTLB 530 makes a translation request to the stage 2 MMU 14 and, when it receives a response, caches the response and provides the translated PA 534 based on the cached response.

The PTW PA 534 is passed to an interface 540 to the ASN and via the ASN to the level 2 cache 50 (or the main system memory) from where page table data 536 is read according to the PA 534.

The page table data 536 is passed to a PTW sequencer 550. Details of the operation of this module will be provided below. The PTW sequencer 550 receives details of translation requests from the stage 1 MMU and communicates with the stage 1 MMU to return a TLB entry 552 (a requested translation or another translation). The PTW sequencer 550 also communicates with the stage 2 MMU to obtain and handle IPA to PA translations.

At stage 2, a PTW process is similarly used, but here the addresses generated for each page table entry are PAs.

Figure 8:
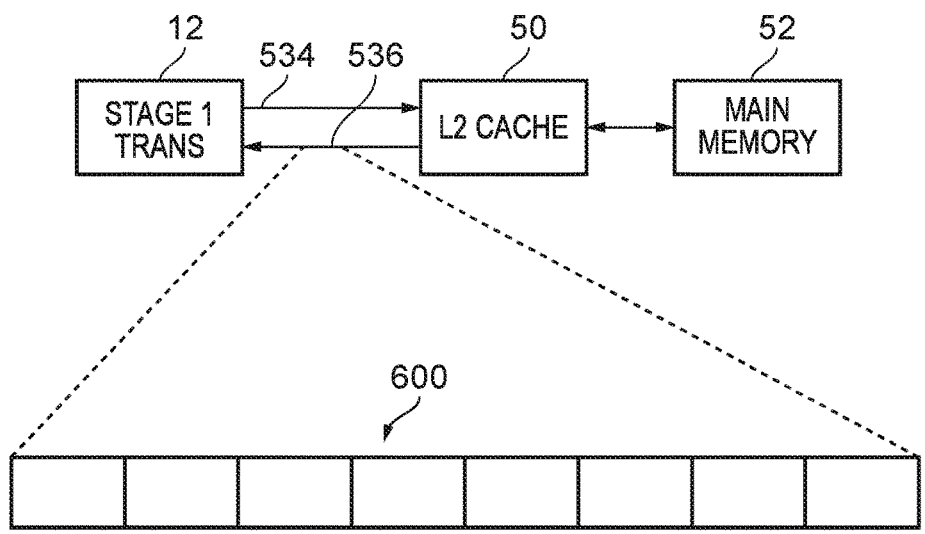
FIG. 8 schematically illustrates data flow between part of an MMU and a cache memory.

FIG. 8 schematically illustrates data flow between part of an MMU and a cache memory.

In particular, FIG. 8 relates to communications between the stage 1 MMU and the level 2 cache memory (or, in the case of a cache miss, the main memory 52) in respect of the final stage (level 3 table) a PTW process. Note that references by the stage 1 MMU 12 to physical memory are made via a stage 2 translation from IPA to PA, but that translation is not shown in FIG. 8 for clarity of the diagram. Nevertheless, it should be assumed that memory address information and 534 sent from the stage 1 MMU is in the form of a PA, having been translated by the PTW µTLB 530.

The response from the level 2 cache 50 to a data access by the stage 1 MMU 12 is in fact a group or "burst" 600 of 8 responses. The reason for this is that the level 2 cache 50 stores information as so-called cache lines of 8 values corresponding to 8 successive memory addresses. Whenever a single memory access is made to the level 2 cache 50, then assuming a cache hit occurs, all 8 values in the cache line containing the required memory address are returned as the read data 536. Note that the MMU routinely obtains a translation in respect of all 8 of these 8 values.

The group of 8 responses 600 can be referred to as a "burst" because in some arrangements, the 8 responses are returned successively, which is to say, one after another over (say) 8 successive clock cycles. However, it is recognised that in other example embodiments, the 8 responses could be returned simultaneously, or in sub-groups (for example, 2 sub-groups of 4 responses each), and so on. Similarly, it is recognised that the group 600 could comprise fewer than, or more than, 8 responses (for example, the group 600 could comprise 4 responses). The size of the group 600 can depend upon the extent of a single cache line or on other factors relating to the internal organisation of the level 2 cache 50.

In the case of level 0, level 1 and level 2 table accesses in the PTW arrangement of FIG. 5, it may be that only one of the group 600 of responses is relevant, because only a single pointer is needed to the next table in the PTW hierarchy. In these cases, the relevant one of the group 600 of responses is identified by the least significant bits of the PA used to access that cache line. For example, if each cache line comprises 8 data values of 32 bits each, so that the group or burst 600 of responses comprises 8 data values, the group or burst 600 of responses have in common all but their address bits [4:2], and the required data value from within that group or burst 600 is identified by the address bits [4:2] (Note that the address bits [1:0] are not relevant in a 32 bit word length system). The other responses represent data stored at adjacent entries in the page table. Note that the entries in the same cache line are considered as an example of a set of adjacent entries.

So in general, the level 2 cache 50 provides, in response to a single memory access by the stage 1 MMU, response data representing a set of two or more intermediate memory addresses comprising the intermediate memory address corresponding to the input virtual memory address; and one or more other intermediate memory addresses representing entries adjacent, in the page table, to the entry holding the corresponding intermediate memory address.

But at the level 3 table in the PTW process of FIG. 5, the situation is a little different in that others of the group 600 of 8 responses may in fact be relevant and useful. This may or may not be the case; simply being adjacent in the page table does not mean that the page table entries are related, but nevertheless it may in fact be that the entries are related. This situation will be discussed in more detail below.

Figure 9:
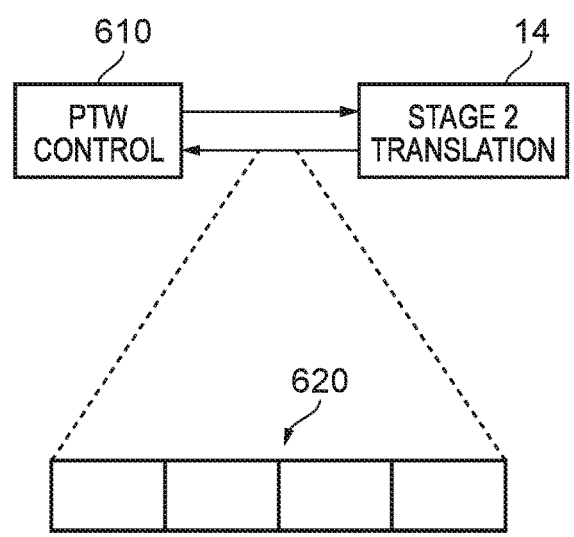
FIG. 9 schematically illustrates data flow at a stage 2 address translation.

FIG. 9 schematically illustrates data flow at a stage 2 address translation.

A block labelled PTW control 610 schematically represents operations of the PTW μTLB 530 and the PTW sequencer 550, each of which can refer IPAs to the stage 2 MMU 14 for translation to PAs, and receive back the relevant PA as a response. The PTW control block 610 is therefore an example of control logic associated with the first MMU stage, and controls the provision of IPAs from the first MMU stage to the second MMU stage. The first MMU stage can therefore be referred to as being configured to provide IPAs to the second MMU stage in a particular way, which is to say, as controlled by the PTW control 610. In terms of a method of operation, a step of the first MMU stage providing one or more IPAs to the second MMU stage relates to the provision of one or more IPAs as controlled by the PTW control 610.

In fact, the stage 2 MMU provides more than one response to a request for translation of a single IPA. The stage 2 MMU provides a set of two or more physical memory addresses comprising the physical memory address corresponding to the intermediate memory address provided to the stage 2 MMU; and one or more other physical memory addresses corresponding to intermediate memory addresses adjacent, in the intermediate memory address space, to the intermediate memory address provided to the stage 2 MMU.

In other words, for a stage 2 translation request relating to a particular IPA, the stage 2 MMU returns not only the PA translation of that IPA, but also other PA translations of adjacent IPAs. In the present example, the stage 2 MMU returns a group or burst 620 of 4 translated PAs which include the required PA along with three other PAs relating to IPAs adjacent to the requested IPA.

The PA corresponding to the requested IPA may be any of the four PAs in the group 620. It is identified, from within the group, by the least significant bits of the requested IPA. So, in the example of a group or burst 620 comprising four PAs, all four PAs correspond to four respective IPAs which share all but the bits [3:2] of their intermediate physical address (assuming, as before, that the bits [1:0] are not relevant in a 32 bit word system). The bits [3:2] of the IPA indicate which of the four responses in the group or burst 620 corresponds to each respective IPA.

Figure 10:
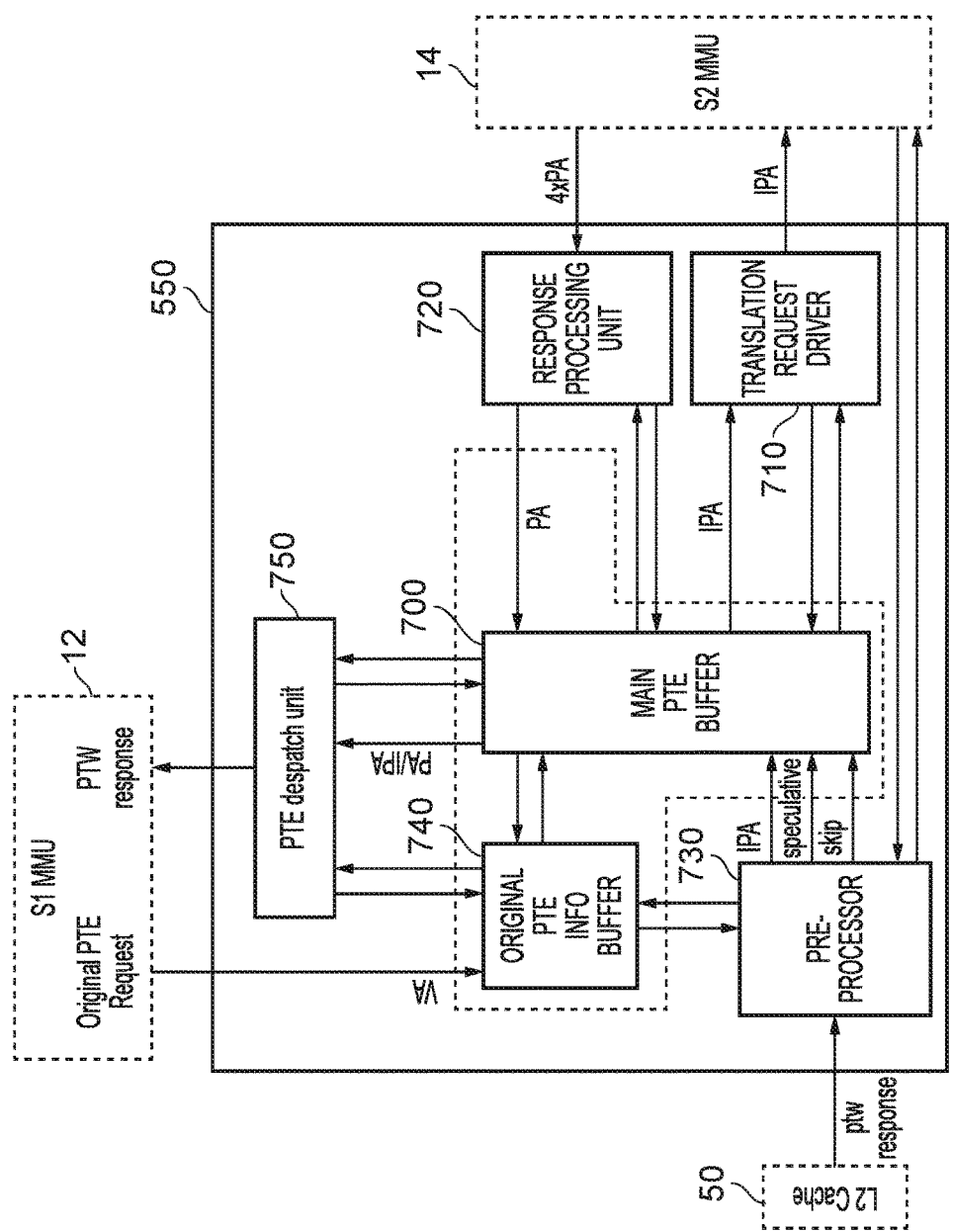
FIG. 10 schematically illustrates a part of an MMU.

FIG. 10 schematically illustrates a part of an MMU. In particular, FIG. 10 schematically illustrates the PTW sequencer 550 in more detail.

The PTW sequencer 550 comprises: a main PTE buffer 700, a translation request driver 710, a response processing unit 720, a pre-processor 730, an original PTE information buffer 740 and a PTE despatch unit 750.

The main PTE buffer 700 stores translation information, for example in a format described below with reference to FIGS. 12 and/or 13. IPAs are provided from the main PTE buffer 700, via the translation request driver 710, to the stage 2 MMU. Burst responses of groups of 4 PAs are returned from the stage 2 MMU 14, via the response processing unit 720, to the main PTE buffer 700, where they are stored prior to being despatched to the stage 1 MMU 12 by the PTE despatch unit 750.

The pre-processor controls the supply of IPAs to the stage 2 MMU from the main PTE buffer 700 and the writing of flag information (discussed below) and translated PAs into the main PTE buffer 700. As part of its operation, the pre-processor 730 refers to information relating to the PTW requests being handled which is stored in the original PTE information buffer 740.

A more detailed description of the operation of these various components of the PTW sequencer 550 will be provided below. As discussed below, the PTW sequencer 550 provides an example of control logic associated with the first MMU stage and configured to control transmission (or provision) of intermediate memory addresses to the second MMU stage for translation, the control logic being configured to detect whether, in response to one of the intermediate memory addresses in the set of two or more intermediate memory addresses, the second MMU stage will provide a physical memory address corresponding to another intermediate memory address in the set of two or more intermediate memory addresses; and if so, to control the first MMU stage: (i) not to provide that other intermediate memory address to the second MMU stage for translation; and (ii) to associate one of the physical memory addresses in the set of two or more physical memory addresses provided by the second MMU stage with that intermediate memory address. Accordingly, in embodiments, the first MMU stage is configured to provide to the second MMU stage for translation, intermediate memory addresses in the set other than any intermediate memory addresses in the set for which the second MMU stage will provide a physical memory address as a response to translation of one of the other intermediate memory addresses in the set.

Figure 11:
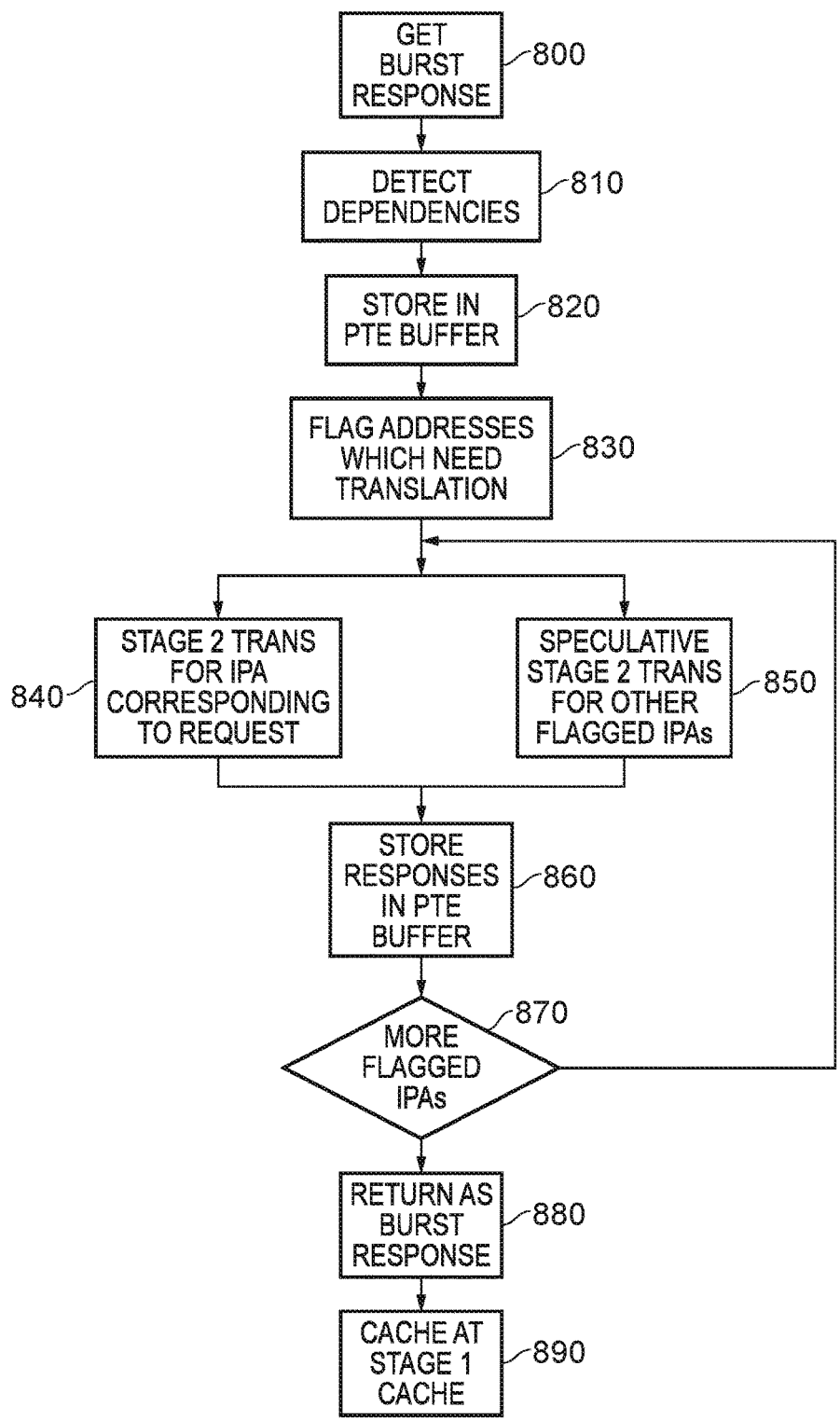
FIG. 11 is a schematic flowchart illustrating operations of an MMU.

FIG. 11 is a schematic flowchart illustrating operations of an MMU in respect of level 3 table PTW operations as an example of features of a method of operation of a memory management unit as referred to above.

At a step 800, the PTW sequencer 550 receives a burst response of 8 values from the level 2 cache 50 during the stage 1 PTW process.

At a step 810, the PTW sequencer 550 (for example, the pre-processor 730 of the PTW sequencer) detects dependencies amongst the burst response of 8 values. The aim here is to detect which of the 8 IPAs in the burst response may not in fact need a separate stage 2 translation operation, on the grounds that a PA corresponding to one or more of the IPAs may in fact be returned as part of the burst response from the stage 2 MMU made in response to another request for IPA to PA translation. This process will be discussed in more detail below.

At a step 820, all 8 IPAs are stored in the main PTE buffer 700, and at a step 830 the PTW sequencer 550 (in particular, the pre-processor 730) flags those IPAs which need stage 2 translation (that is to say, which are to be provided from the stage 1 MMU to the stage 2 MMU), taking into account the dependencies detected at the step 810. In this way, the main PTE buffer 700 provides an example of a buffer configured to store at least those of the set of two or more physical memory addresses received from the second MMU stage which correspond to intermediate memory addresses in the set of two or more intermediate memory addresses.

Amongst those IPAs which do need translation, for the IPA corresponding to the original request made by the stage 1 MMU and/or another IPA request within a threshold address separation (in the IPA address space) of that IPA, stage 2 translation is initiated at a step 840. For another IPA which is flagged for translation but did not correspond to the original request, a so-called speculative stage 2 translation is initiated at a step 850. Speculative translation is similar in most respects to non-speculative translation except that if the translation fails, an error code is not generated. Accordingly, in example embodiments, for any one of the intermediate memory addresses in the set of two or more intermediate memory addresses other than the intermediate memory address corresponding to the input virtual memory address, the control logic is configured to control the transmission of that intermediate memory address to the second MMU stage for translation in a speculative translation mode so that an error message is not generated if the translation of that intermediate memory address fails.

The translation responses are stored in the main PTE buffer 700 at a step 860. Note that the response from the stage 2 MMU is a burst of 4 responses representing not only the requested IPA but also IPAs having adjacent intermediate physical addresses. In instances at which dependencies have been detected at the step 810, one or more of these other responses may be relevant to IPAs awaiting translation in the main PTE buffer 700. in such cases, the PA corresponding to one or more IPAs in the main PTE buffer 700 can be stored as a PA translation relating to that IPA. In this way, the 8 PA translations required for the 8 IPAs in the main PTE buffer 700 can be populated in fewer than 8 stage 2 MMU translation requests, by detecting whether any PA translations will be obtained as part of burst responses relating to other IPA translation requests, and re-using those additional PA translations to populate the main PTE buffer 700. The step 860 therefore includes, for a non-flagged IPA which is not provided to the second MMU stage for translation, the step of associating one of the PAs in the set of two or more PAs provided by the second MMU stage with that IPA.

If there remain more flagged IPAs require translation (at a step 870) then control returns to the steps 840, 850. Otherwise, all of the 8 IPAs in the main PTE buffer 700 now have a corresponding PA and the eight PAs are returned as a burst response to the stage 1 MMU at a step 880. Finally, at a step 890, the PAs are cached at the stage 1 TLB 270.

Figure 12:
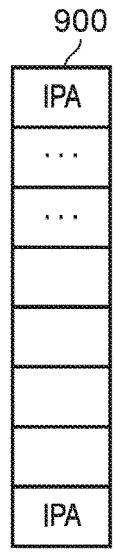
FIGS. 12 and 13 schematically illustrate data storage in a data buffer of an MMU.
Figure 12:
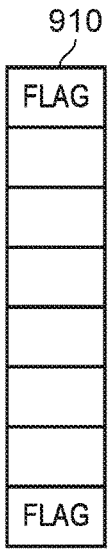
Figure 12:
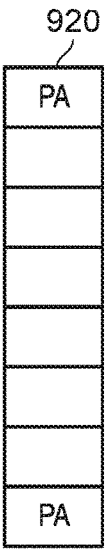
Figure 13:
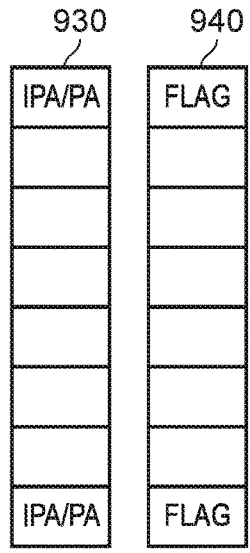

FIGS. 12 and 13 schematically illustrate data storage in a data buffer (in particular, the main PTE buffer 700) of an MMU.

In FIG. 12, 8 IPAs 900 corresponding to the burst response from the level 2 cache 50 at the level 3 table stage of the stage 1 PTW operation are stored, along with respective flags 910 derived at the steps 810, 830 of FIG. 11. The flags 910 indicate whether a translation is required for each respective IPA 900. Corresponding PAs 920 are populated at the step 860 of FIG. 11 in response to burst responses from the stage 2 MMU.

In FIG. 13, a single storage location 930 is provided for each respective IPA, such that the IPA is overwritten by the corresponding PA value in response to a translation being obtained for that IPA. A flag 940 can operate similarly to the flag 910 in FIG. 12, indicating whether a translation operation is required for each IPA.

Figure 14:
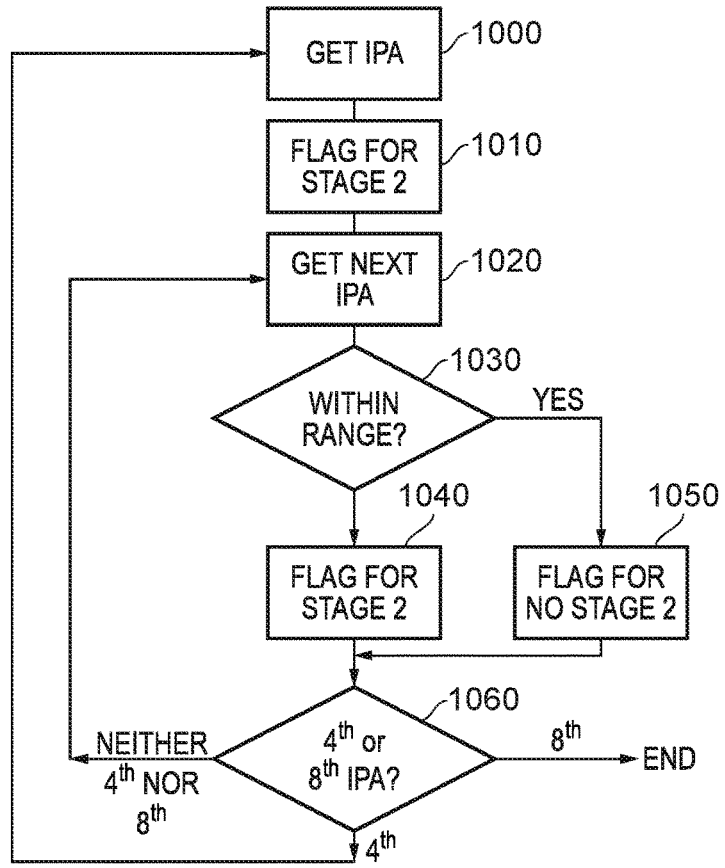
FIG. 14 is a schematic flowchart illustrating operations of an MMU.

FIG. 14 is a schematic flowchart illustrating operations of an MMU, as an example of features of a method of operation of a memory management unit as referred to above. In this example, the burst of 8 responses from the level 2 cache 50 (to the stage 1 MMU) is obtained as successive responses over a period of, for example, 8 successive clock cycles. So, in this example, each IPA in the burst of eight responses is considered in turn.

At a step 1000, a first IPA of the burst of eight IPAs is received and at a step 1010 it is flagged for stage 2 translation. The remaining seven IPAs are then handled. A next IPA is obtained at a step 1020. At a step 1030, a detection is made as to whether the IPA obtained at the step 1020 is within a range of a previously flagged IPA in the current burst such that a PA translation for the IPA obtained at the step 1020 will already be obtained by a stage 2 translation of the previously flagged IPA. The test applied here is whether all except the least significant 12 bits of the IPA are the same as the corresponding bits of the previously flagged IPA. The test of all but the most significant 12 bits (that is to say, a comparison of bits [47:12]) indicates whether the IPA relates to the same memory page (in the IPA address domain) as the previously flagged IPA. The test is therefore an example of one in which control logic, configured to control transmission of intermediate memory addresses by the first MMU stage to the second MMU stage for translation, is configured to detect whether two or more intermediate memory addresses in the set of two or more intermediate memory addresses are within a threshold separation of one another in the intermediate memory address space.

In some embodiments, the one or more IPAs provided from the first MMU stage to the second MMU stage includes at least the IPA corresponding to the original request, that is to say, the original input VA.

This test can be carried out in respect of all previously flagged IPAs in the current group under consideration, or (for example) just the most-recently flagged IPA.

If the answer is no, then at a step 1040 the IPA obtained at the step 1020 is flagged for stage 2 translation. If the answer is yes then control passes to a step 1050, at which either no flag is set or (depending on the syntax being used for the flags) a flag is set to indicate that stage 2 translation should not take place. Control passes to a step 1060.

At the step 1060, a detection is made as to whether the IPA obtained at the step 1020 was the fourth or the eighth IPA in the current burst response of eight IPAs. If the IPA obtained at the step 1020 was neither the fourth nor the eighth IPA then control returns to the step 1020 to get another IPA. If the IPA was the eighth IPA then the burst response has been fully handled and the process ends. If the IPA was the fourth IPA then control returns to the step 1000.

The flagged IPAs are sent for stage 2 translation to provide one or more of the intermediate memory addresses in the set of two or more intermediate memory addresses to the second MMU stage so as to obtain physical memory addresses corresponding to each of the intermediate memory addresses in the set of two or more intermediate memory addresses. The burst responses received from the stage 2 MMU in response to those IPAs sent for stage 2 translation provide sufficient information (because of the dependency test mentioned above) to populate all eight entries in the main PTE buffer 700.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A multiple stage memory management unit (MMU) comprising:
   a first MMU stage configured to translate an input virtual memory address to a corresponding intermediate memory address, the first MMU stage generating a set of two or more intermediate memory addresses including the corresponding intermediate memory address; and
   a second MMU stage configured to translate an intermediate memory address provided by the first MMU stage to a physical memory address, the second MMU stage providing, in response to an intermediate memory address received from the first MMU stage, a set of two or more physical memory addresses including the physical memory address corresponding to the intermediate memory address received from the first MMU stage;
   the first MMU stage being configured to provide to the second MMU stage for translation, intermediate memory addresses in the set other than any intermediate memory addresses in the set for which the second MMU stage will provide a physical memory address as a response to translation of one of the other intermediate memory addresses in the set.

2. A memory management unit according to claim 1, comprising:
   a buffer configured to store at least those of the set of two or more physical memory addresses received from the second MMU stage which correspond to intermediate memory addresses in the set of two or more intermediate memory addresses.

3. A memory management unit according to claim 1, in which:
   the first MMU stage is configured to translate an input virtual memory address with reference to a page table;
   and in which the set of two or more intermediate memory addresses comprises:
   the intermediate memory address corresponding to the input virtual memory address; and
   one or more other intermediate memory addresses representing entries adjacent, in the page table, to the entry holding the corresponding intermediate memory address.

4. A memory management unit according to claim 1, in which the set of two or more physical memory addresses comprises:
   the physical memory address corresponding to the intermediate memory address provided to the second MMU stage; and
   one or more other physical memory addresses corresponding to intermediate memory addresses adjacent, in the intermediate memory address space, to the intermediate memory address provided to the second MMU stage.

5. A memory management unit according to claim 1, comprising control logic configured to control transmission of intermediate memory addresses by the first MMU stage to the second MMU stage for translation, and configured to detect whether two or more intermediate memory addresses in the set of two or more intermediate memory addresses are within a threshold separation of one another in the intermediate memory address space.

6. A memory management unit according to claim 5, in which the control logic is configured to provide one or more of the intermediate memory addresses in the set of two or more intermediate memory addresses to the second MMU stage so as to obtain physical memory addresses corresponding to each of the intermediate memory addresses in the set of two or more intermediate memory addresses.

7. A memory management unit according to claim 6, in which, for any one of the intermediate memory addresses in the set of two or more intermediate memory addresses other than the intermediate memory address corresponding to the input virtual memory address, the control logic is configured to control the transmission of that intermediate memory address to the second MMU stage for translation in a speculative translation mode so that an error message is not generated if the translation of that intermediate memory address fails.

8. A memory management unit according to claim 6, in which the one or more intermediate memory addresses provided to the second MMU stage includes at least the intermediate memory address corresponding to the input virtual memory address.

9. A memory management unit according to claim 1, in which:
   the first MMU stage is configured to access a hierarchy of page tables, such that a page table higher in the hierarchy provides information for address translation by the second stage MMU to point to a page table next lower in the hierarchy.

10. A memory management unit according to claim 9, in which:
    a lowest page table in the hierarchy provides the set of two or more intermediate memory addresses including the corresponding intermediate memory address.

11. A memory management unit according to claim 1, comprising an address translation cache associated with the first MMU stage, the address translation cache being configured to store, for a set of virtual memory addresses, address translation information comprising:
    information defining address translations from those virtual memory addresses to respective mapped addresses, the mapped addresses being intermediate memory addresses or physical memory addresses; and
    flag information indicating, for each virtual memory address in the set of virtual memory addresses, whether the mapped address corresponding to that virtual memory address is an intermediate memory address or a physical memory address.

12. A multiple stage memory management unit (MMU) comprising:
    a first MMU stage configured to translate an input virtual memory address to an intermediate memory address;
    a second MMU stage configured to translate an intermediate memory address provided by the first MMU stage to a physical memory address; and
    an address translation cache associated with the first MMU stage, the address translation cache being configured to store, for a set of virtual memory addresses, address translation information comprising:
    information defining address translations from those virtual memory addresses to respective mapped addresses, the mapped addresses being intermediate memory addresses or physical memory addresses; and flag information indicating, for each virtual memory address in the set of virtual memory addresses, whether the mapped address corresponding to that virtual memory address is an intermediate memory address or a physical memory address;

the multiple stage MMU being configured to store an intermediate memory address in the address translation cache along with the flag indicating that the stored address is an intermediate memory address requiring translation to a physical memory address and, in response to a translation being obtained for that intermediate memory address, to overwrite that intermediate memory address by the corresponding physical memory address and to set the flag to indicate that the stored address is a physical memory address.

13. A memory management unit according to claim 12, in which:

the first MMU stage is configured to access a hierarchy of page tables, such that a page table higher in the hierarchy provides information for address translation by the second stage MMU to point to a page table next lower in the hierarchy.

14. A memory management unit according to claim 13, in which:

a lowest page table in the hierarchy defines an intermediate memory address corresponding to the input virtual memory address; and the address translation cache is configured to store address translation information in respect of the lowest page table in the hierarchy.

15. A method of operation of a multiple stage memory management unit (MMU, the method comprising:

translating, at a first MMU stage, an input virtual memory address to a corresponding intermediate memory address, the translating step generating a set of two or more intermediate memory addresses including the corresponding intermediate memory address;

translating, at a second MMU stage, an intermediate memory address provided by the first MMU stage to a physical memory address, comprising providing, in response to an intermediate memory address received from the first MMU stage, a set of two or more physical memory addresses including the physical memory address corresponding to the intermediate memory address received from the first MMU stage; and the first MMU stage providing to the second MMU stage for translation, intermediate memory addresses in the set other than any intermediate memory addresses in the set for which the second MMU stage will provide a physical memory address as a response to translation of one of the other intermediate memory addresses in the set.

16. A method of operation of a multiple stage memory management unit (MMU), the method comprising:

translating, at a first MMU stage, an input virtual memory address to an intermediate memory address;

translating, at a second MMU stage, an intermediate memory address provided by the first MMU stage to a physical memory address;

caching, in association with the first MMU stage and for a set of virtual memory addresses, address translation information comprising:

information defining address translations from those virtual memory addresses to respective mapped addresses, the mapped addresses being intermediate memory addresses or physical memory addresses;

flag information indicating, for each virtual memory address in the set of virtual memory addresses, whether the mapped address corresponding to that virtual memory address is an intermediate memory address or a physical memory address; and storing an intermediate memory address in the address translation cache along with a flag indicating that the stored address is an intermediate memory address requiring translation to a physical memory address and, in response to a translation being obtained for that intermediate memory address, overwriting that intermediate memory address by the corresponding physical memory address and setting the flag to indicate that the stored address is a physical memory address.

* * * * *